UNITED STATES PATENT OFFICE.

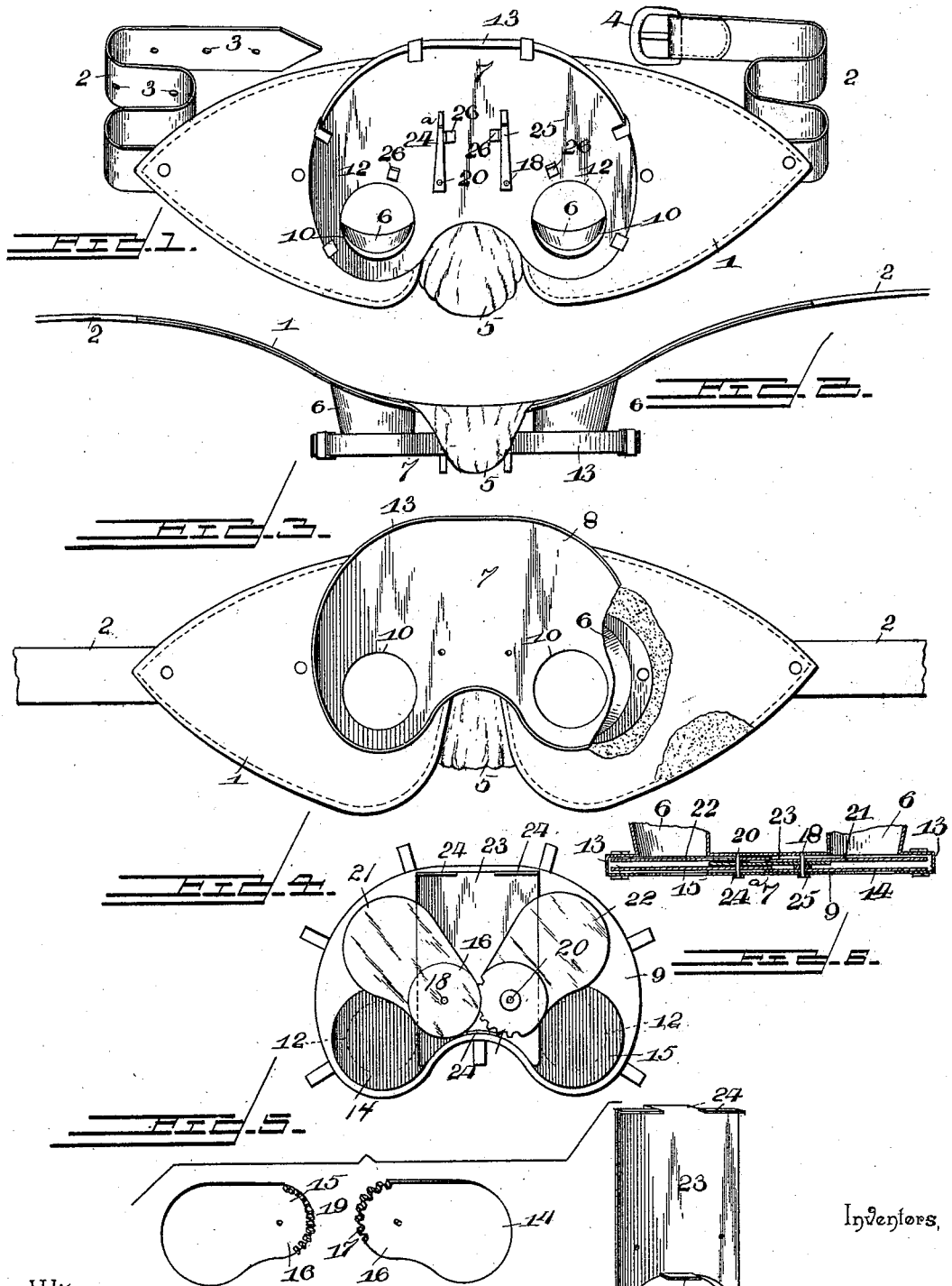

EDMUND DE MOULIN AND ULYSSES S. DE MOULIN, OF GREENVILLE, ILLINOIS.

HOODWINK.

SPECIFICATION forming part of Letters Patent No. 562,071, dated June 16, 1896.

Application filed August 19, 1895. Serial No. 559,836. (No model.)

*To all whom it may concern:*

Be it known that we, EDMUND DE MOULIN and ULYSSES S. DE MOULIN, citizens of the United States, residing at Greenville, in the county of Bond and State of Illinois, have invented a new and useful Hoodwink, of which the following is a specification.

The object of our invention is to provide an improved hoodwink for use by lodges and secret societies in initiations and other rites, or for use wherever it is desired to blindfold or to produce startling optical effects on the candidate.

With these objects in view our invention consists of the various details and combinations hereinafter described, and more particularly defined in the claims.

In the drawings forming a part of this specification, Figure 1 is a perspective view of our invention. Fig. 2 is an inverted plan view. Fig. 3 is a front elevation with the casing-cover removed and with parts broken away to show the eyepiece and details of the face-pad. Fig. 4 is a rear elevation of the casing-cover, showing also the shutter mechanism in place. Fig. 5 is a detail view of one pair of shutters and of the separating-plate. Fig. 6 is a horizontal section of the casing to show the operative connection of the handles.

Referring to the parts by numerals, 1 designates the face-pad, which is made of flexible material, such as soft leather, and suitably lined with velvet, felt, or other material agreeable to the face, and is provided at either end with straps 2, adjustable about the head by means of eyelets 3 and buckle or hook 4. This pad 1 is of such contour as to effectually shut out all light from the sides, and is also provided with a nose-piece 5, preferably of soft material gathered full, thereby accommodating itself to the configuration of the nose and more certainly excluding light.

Attached to the front of pad 1 and in alinement with the position of the eyes are conical eyepieces 6, obliquely truncated at the rear to conform to the oval of the face and transversely truncated at their outer projecting ends, so as to receive the shutter-casing 7, which is soldered or otherwise secured thereto. This casing 7 embraces a rear piece and front piece 9, each perforated suitably at 10 and 12 in alinement with the eyepieces and suitably separated in parallel planes by a peripheral flange 13, said casing extended upwardly to provide a chamber to receive the shutter mechanism. The casing and eyepieces may be made of tin or other light rigid material, and the parts thereof may be soldered, crimped, or otherwise fastened together, and the casing connects the eyepieces and is provided at its lower edge with a central recess to clear the space for the nose of the candidate.

Our shutter mechanism consists of screens adapted to swing in pairs simultaneously before the eyes, and of these there may be any desirable number of pairs. In the present instance two pairs are shown. 14 and 15 designate one pair of these screens, which pair lies adjacent to the casing-cover 9 and is opaque, being formed out of sheet tin, brass, celluloid, rubber, or other suitable opaque material. Each screen is provided with an extension 16, to which is attached, or formed integral therewith, suitable gearing mechanism. Screen 14 is provided with spur-teeth 17 along a segment of extension 16, and concentric to said teeth is a transverse pivot-shaft 18, to which screen 14 is fixed. Screen 15 is similarly provided with teeth, preferably with crown gear-teeth 19, and is loosely pivoted on a transverse shaft 20, concentrically to said teeth and so arranged relatively to shaft 18 that teeth 17 mesh with teeth 19.

Back of the opaque screens 14 and 15 is a pair of transparent screens 21 22, preferably red in color, although any color desired may be used and constructed similarly to the preceding pair of screens, arranged, however, so that screen 22 is fixed to shaft 20 and is provided with spur-teeth, and screen 21 is loose on shaft 18 and is provided with the crown gear-teeth. This particular gearing is preferred because it permits of the use of lighter and thinner material and is surer in operation; but any other arrangement of gearing is within the scope of our invention. Between these two pairs of screens is a separating or partition plate 23, provided with flanges 24 at either end, bent or formed in opposite directions to constitute strengthening and spacing posts. Plate 23 is suitably perforated to form bearings for shafts 18 and 20, not only giving extra support, but also furnishing thereby a means of alinement of the shafts with the rear bearings in assembling the parts together and also serving to prevent interference between the two pairs of screens as they are swung back and forth. Washers are suitably arranged on the shafts between the parts to relieve the friction. The shafts are also provided with suitable front and rear bearings in the casing, and at their forward ends extend slightly beyond the front thereof to receive operating-handles 24$^a$ 25, respectively. Stops 26, projecting from the face of the cover, serve to limit the movements of said handles.

The operation of our invention is evident. Pad 1 is comfortably adjusted over the eyes and adjacent parts of the face and is secured by means of the straps 2. The handles are supposed to be up, in which position of parts the candidate has uninterrupted vision through the open sight-holes. To plunge the candidate into total darkness, handle 25 is swung down, which movement carries screen 14 down, and, by reason of the gearing, screen 15 also moves correspondingly. Now if it is desired to present the red shutter before the candidate handle 24$^a$ is swung down, which causes both red screens 21 22 to move down simultaneously behind the opaque screens. Handle 25 is then restored to its upright position, thereby carrying the opaque screens out of the way and leaving only the red screens in the candidate's line of vision.

It is evident that various modifications and changes in details may be made within the scope of our invention.

What we claim as new, and desire to secure by Letters Patent, is—

1. In a hoodwink, the combination with a suitable face-pad provided with projecting eyepieces, of a casing attached to and connecting the outer ends of the eyepieces and having openings to correspond therewith, a suitable shutter mechanism provided with double shutters adapted to close the openings of the casing and to be operated alternately to distort the vision through the eyepieces, said shutter mechanism being entirely inclosed within the said casing, whereby compactness is secured and liability to injury obviated, and means for operating the shutter mechanism from the exterior of the casing, substantially as described.

2. In a hoodwink, the combination with a face-pad provided with projecting eyepieces, of a casing attached to and connecting the outer ends of the eyepieces, and provided with openings corresponding therewith, a shutter mechanism arranged within the casing, disposed at right angles to the line of vision and moving simultaneously in opposite directions, and means for operating the shutter mechanism from the exterior of the casing, substantially as described.

3. In a hoodwink, the combination with a face-pad provided with projecting eyepieces, of a casing mounted on and connecting the outer ends of the eyepieces and provided with corresponding openings, a pair of shafts journaled on the casing and disposed longitudinally of the eyepieces, and provided with exteriorly-arranged handles, and a shutter mechanism comprising two pairs of shutters disposed at right angles to the line of vision and mounted on the said shafts and connected together to move simultaneously in opposite directions, one pair of shutters having one of its members fixed to one shaft and loose on the other, and the other pair being reversely arranged so that each shaft has one fixed shutter and one loose shutter, whereby the shutters are independently geared and are capable of independent operation, substantially as and for the purpose described.

4. In a hoodwink, the combination with the face-pad, provided with fastening means, and having the projecting eyepieces fastened thereto, of an inclosing casing attached to said projecting eyepieces and containing a shutter mechanism, said shutter mechanism consisting of a pair of opaque screens, one of which is fast on a shaft and the other of which is loose on a shaft, said screens being provided with intermeshing gears, a pair of colored transparent screens mounted on the aforesaid shafts one of said latter screens fixed to one of the shafts and the other loose on its shaft said screens provided with intermeshing gears and a flanged separating-plate adjusted between said pairs of screens, handles external to said casing and applied respectively to the projecting ends of said shafts, and stops therefor, whereby through the operation of said handles the light through said eyepieces is interrupted or distorted, substantially as set forth.

In testimony that we claim the foregoing as our own we have hereto affixed our signatures in the presence of two witnesses.

EDMUND DE MOULIN.
ULYSSES S. DE MOULIN.

Witnesses:
C. E. COOK,
CHAS. INGELS.